July 20, 1954  P. A. LOVASIK  2,683,907
SEALING DEVICE
Filed July 9, 1953

INVENTOR.
PETER A. LOVASIK
BY
ATTORNEYS

Patented July 20, 1954

2,683,907

UNITED STATES PATENT OFFICE 2,683,907

SEALING DEVICE

Peter A. Lovasik, North Hollywood, Calif., assignor, by mesne assignments, to the United States of America as represented by the Secretary of the Navy Application July 9, 1953, Serial No. 367,025

9 Claims. (Cl. 20—69)

This invention relates to improvements in sealing devices or elements and particularly to means adaptable for sealing engine compartments and the like against air pressure.

Seals of this type are exposed to the elevated temperatures of these compartments and may be in direct contact with the hot engine. Such seals are used between the engine and adjacent structure or about the periphery of openings in bulkheads or fire walls which divide the area about the engine into various compartments. These individual areas may require varying pressures according to cooling or ventilating requirements. The seals may also be required to accommodate dimensional variations arising from installation tolerances, misalignment, vibration and flexing during operation, changes of temperatures and pressures, and the like. The seal must accordingly be tough to resist abrasion and scuffing, remain flexible over a wide temperature range, and retain its shape and resiliency at elevated temperatures.

Various types of sealing elements have been developed and are known in the art, typical of which are those of U. S. Patents 1,733,880; 2,049,064; and 2,195,046. In many instances such seals have not proven entirely satisfactory, especially for use in sealing engine compartments.

Accordingly, one object of this invention is the provision of sealing elements particularly adaptable for sealing engine compartments and the like.

A particular object is to provide seals of the foregoing type which are constructed to accommodate dimensional variations arising from various sources such as vibration and flexing during operation, and changes of temperature and pressure.

Another object of the invention is to afford seals which are resistant to abrasion and scuffing, remain flexible over a wide temperature range and retain their shape and resiliency at elevated temperature.

Yet another aim of the invention is the provision of sealing elements which are durable, light-weight, simple in structure and readily attachable, and which are easily fabricated from commercially available materials.

Other objects and many of the attendant advantages of this invention will be readily appreciated as the same becomes better understood by reference to the following detailed description when considered in connection with the accompanying drawings wherein.

Figure 1:
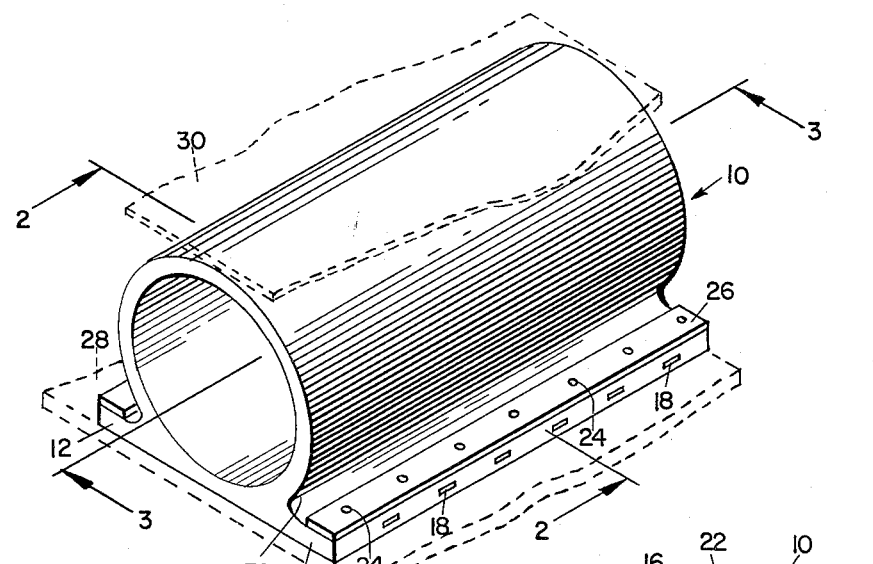
Fig. 1 is an isometric view of one embodiment of the sealing element of the invention in operative relation with other cooperating structure.
Figure 4:
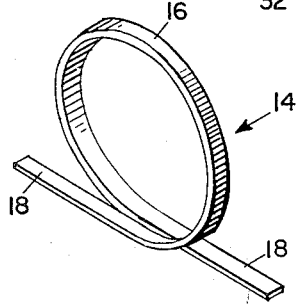
Fig. 4 is a detail of a feature of the invention device shown in Fig. 1.
Figure 2:
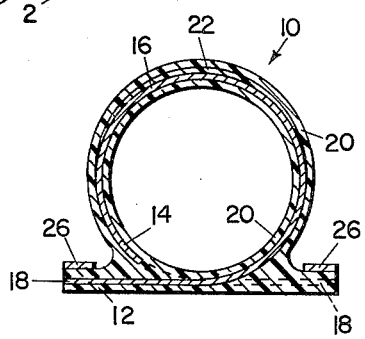
Fig. 2 is a vertical cross section taken along line 2—2 of the sealing element of Fig. 1.
Figure 3:
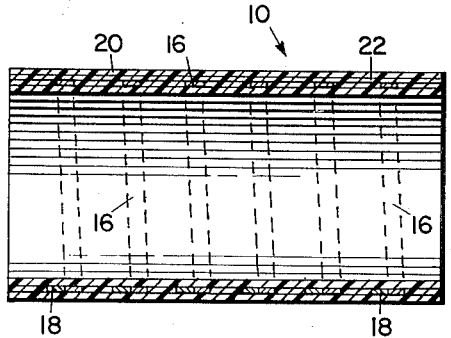
Fig. 3 is a vertical longitudinal section taken along line 3—3 of the sealing element of Fig. 1.

The seal unit shown in Figs. 1 to 4 of the drawing and illustrating a preferred embodiment of the invention, comprises a flexible tubular member 10 and a pair of outwardly extending opposed flanged portions 12 attached to the outer periphery of such member, these flanged portions being preferably formed integral with the tubular member. Tubular member 10 and flanged portions 12 may be fabricated of laminations of glass fabric impregnated with a resinous material. It has been found that suitable resinous materials for purposes of the invention include silicones or silcon rubber compounds such as that known as "Dow-Corning X-1740," which is satisfactory for operating temperatures up to 300° F., tetrafluorethylene polymer known as "Teflon" and marketed by DuPont Company, and monochlorofluorethylene polymer marketed as "Kel-F" by the William Kellog Company. Silicones are preferred for properties of resistance to deterioration by oil and suitability for low temperature or high temperature ranges.

To obtain the desired resiliency and insure shape retention for the seal unit a plurality of individual spring elements 14 are molded into the unit. The springs are preferably made from flat strips of steel and include a loop 16 and outwardly projecting opposed end portions 18. These end portions are located in a plane which is substantially parallel to the axis of the spring loop. The springs are located in spaced relationship along the length of the seal unit and are positioned between the plies 20 of glass fabric. These laminations overlie all of the portions of the springs, which are completely embedded in the finished seal unit after curing the resinous material. The loop portions 16 of spring elements 14 and the extending ends 18 thereof are respectively embedded in tubular member 10 and flanged portions 12. Additional layers of glass cloth may be provided in the tubular member as at 22 to increase the durability of the seal. The added layers are preferably feathered at the edges to give a smoothly faired contour and may be inserted beneath the final outer ply of laminate.

The seal is secured in position on an installation as shown in Fig. 1, by rivets 24 passing through the flanged portions 12. Retaining strips 26 may be applied over the flanged portions to assist in securing the seal in position, the rivets passing through the strips and between the spring elements in the flanges to attach the seal to a bulkhead or other structure, indicated at 28. The seal is thus retained in position on the structure for contact with adjacent surface 30. The installed seal may be subjected to compressive forces tending to flatten or deform it from its original shape and is designed to accommodate deflection of this sort. The spring loops aid in restoring the initial full contour of tubular member 10, insuring a tight seal at all times.

The foregoing structure provides improved service life since the ends 18 of the springs 14 are secured by the retaining strips 26 which serve to reinforce the flanges 12. This prevents tearing which might otherwise occur at the intersections 32 of the flanged portions and the body of tubular member 10 from side loads, resulting in separation and delamination.

It is thus apparent that the sealing element of the invention provides a durable yet light-weight unit having good resiliency and shape retaining characteristics, and which is readily attachable and resists displacement. This sealing unit is readily adaptable to fabrication by production methods using conventional assembling jigs and molding techniques.

Obviously many modifications and variations of the present invention are possible in the light of the above teachings. It is therefore to be understood that within the scope of the appended claims the invention may be practiced otherwise than as specifically described.

I claim:

1. A sealing device which comprises a flexible tubular member, a pair of outwardly extending opposed flanged portions attached to the outer periphery of said member and a plurality of spring elements located in spaced relationship along the length of said device, each of said spring elements being in the form of a loop having outwardly extending opposed end portions, said loops being embedded in said tubular member and said end portions being embedded in said flanged portions.

2. A sealing device which comprises a plurality of juxtaposed spaced apart spring elements, each of said elements being in the form of a loop having outwardly extending opposed end portions, a flexible material overlying said spring elements and forming a tubular member supported by said spring elements and containing therein the loops of each of said elements, and a pair of outwardly extending opposed flanged portions attached to the outer periphery of said tubular member and containing therein the opposed end portions of said spring elements.

3. A sealing unit which comprises a flexible tubular member, a pair of outwardly extending opposed flanged portions tangentially attached to the outer periphery of said member and a plurality of spring elements located in spaced relationship along the length of said unit, each of said spring elements being in the form of a complete loop having outwardly projecting opposed end portions, said loops being embodied in said tubular member in a position essentially normal to the axis thereof, and said end portions being embedded in said flanged portions.

4. A sealing unit as defined in claim 3 wherein said spring elements are formed of flat strips of steel.

5. A sealing unit as defined in claim 3, including reinforcing means for said flanged portions.

6. A sealing device as defined in claim 1 wherein said tubular member is constructed of laminations of glass fabric impregnated with a resinous material.

7. A sealing device as defined in claim 1 wherein said flanged portions are formed integral with said tubular member and wherein said tubular member and said flanged portions are constructed of laminations of glass fabric impregnated with a silicon rubber compound.

8. A sealing unit as defined in claim 3 wherein said flanged portions are formed integral with said tubular member, and said tubular member and said flanged portions are constructed of laminations of glass fabric impregnated with a resinous material.

9. A sealing unit as defined in claim 3 wherein said flanged portions are formed integral with said tubular member, and said tubular member and said flanged portions are constructed of laminations of glass fabric impregnated with a silicon rubber compound, said laminations essentially completely overlying said spring elements, the latter being positioned between the plies of glass fabric.

References Cited in the file of this patent

UNITED STATES PATENTS

| Number | Name | Date |
| --- | --- | --- |
| 2,049,064 | Julien | July 28, 1936 |
| 2,195,046 | Best | Mar. 26, 1940 |
| 2,446,281 | Harding | Aug. 3, 1948 |
| 2,525,070 | Greenwald et al. | Oct. 10, 1950 |
| 2,653,887 | Slayter | Sept. 29, 1953 |